Jan. 3, 1933.   H. ERNST ET AL   1,893,068
CONTROL FOR HYDRAULIC SYSTEMS
Original Filed Sept. 15, 1927   6 Sheets-Sheet 1

Fig.1.

Inventors
Hans Ernst
Lester F. Nenninger
By Attorneys
Nathan & Bowman

Patented Jan. 3, 1933

1,893,068

UNITED STATES PATENT OFFICE

HANS ERNST AND LESTER F. NENNINGER, OF CINCINNATI, OHIO, ASSIGNORS TO THE CINCINNATI MILLING MACHINE COMPANY, OF CINCINNATI, OHIO, A CORPORATION OF OHIO

CONTROL FOR HYDRAULIC SYSTEMS

Original application filed September 15, 1927, Serial No. 220,721. Divided and this application filed December 18, 1928. Serial No. 326,841.

This invention relates primarily to a new and improved hydraulic system and means to control the action thereof.

Hydraulic systems are utilized for many purposes among which may be noted the effecting of reciprocation of an element of a machine tool. A milling machine is a good example of a machine tool adapted to be actuated hydraulically and therefore this invention will be shown and described in connection with that type of machine tool, but it is to be understood that the invention is equally adaptable to various other types of machine tools and that it may be utilized for various other purposes.

One of the objects of this invention is to provide an improved hydraulic system including a main control valve adapted to control the rate and direction of movement of a translated member together with an auxiliary stop valve adapted in one position to discontinue all flow of fluid to and from the hydraulic motor, thereby positively to lock the translated member against movement in either direction.

A conventional milling machine includes a reciprocating work-carrying table and a rotating tool-carrying spindle. Another object of this invention is to provide an interlock between the spindle rotating train and the stop valve whereby the stop valve is actuated to lock the table against movement when the spindle rotating train is rendered ineffective. This interlock precludes all possibility of the work-piece being jammed against a stationary cutter which would cause damage to the work or to the machine, or to both.

This application is a division of our pending application, Serial No. 220,721, filed September 15, 1927.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Referring more specifically to the drawings the invention is disclosed as embodied in a milling machine comprising a base $B^5$, a reciprocating work-table T translatably mounted on ways provided by the base, a column C arising from the base, a carriage adjustably suported upon the column and a rotating cutter spindle S' journaled in said carriage. Within the base $B^5$ there is located a prime-mover, here represented as a motor 1 which is readily accessible through a suitable hinged door, not shown.

Figure 12:
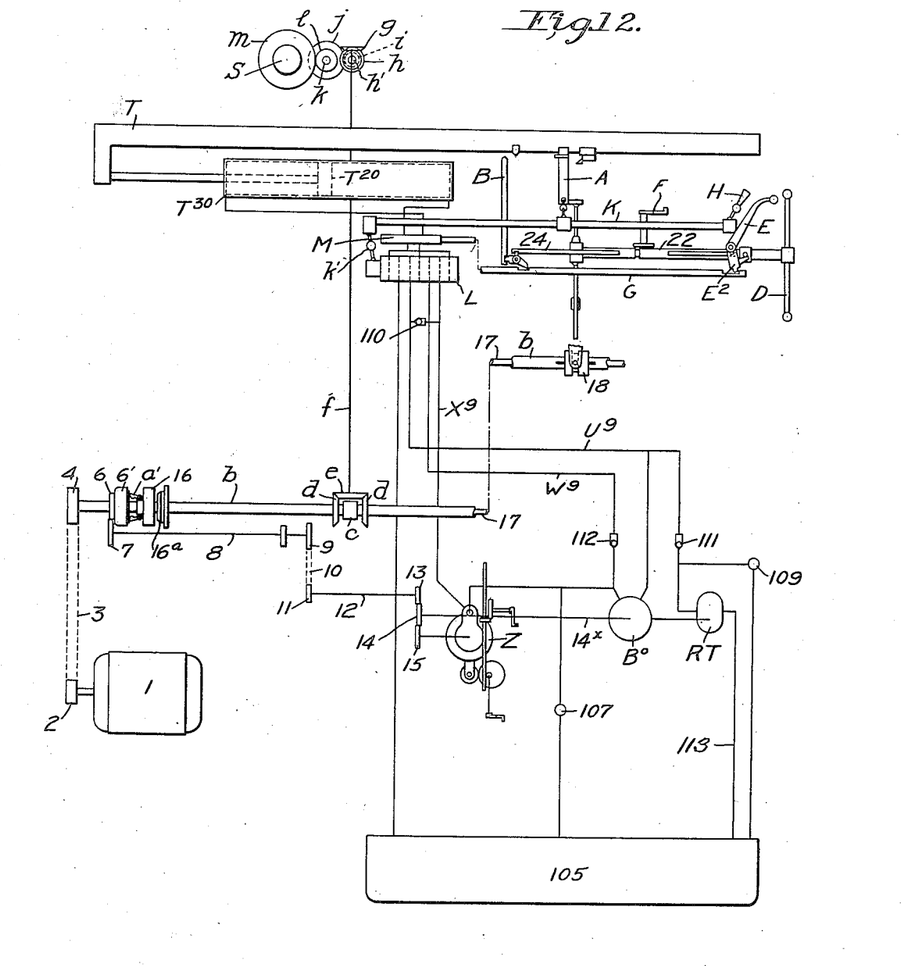
Fig. 12 is a diagrammatic representation of the hydraulic system, the mechanical drive for the three pumps, the mechanical drive for the cutter spindle, the automatic and manual controls and the safety interlock between the hydraulic system and the spindle driving train.

Fig. 12 shows diagrammatically the mechanical drives from the motor 1 to the cutter spindle S' and to the three pumps later to be referred to. Motion is conveyed from the initial pulley 2, on the motor shaft, through a chain 3 to a pulley 4 secured to a sleeve 5 having a pinion 6 and a clutch member 6'. Beginning at the pinion 6 the transmission extends as a branch line to a hydraulic pumping system utilized for shifting the table as will be explained presently.

This branch line comprises a constantly running pinion 6 meshing with a constantly driven pinion 7 keyed to a shaft 8 which extends from the rear side of the machine in its base, towards the front side and terminates in a pulley 9 which drives a constantly running chain belt 10 and thereby a pulley 11 keyed to a stub shaft 12 carrying a constantly running gear 13. This gear drives the hydraulic system; to wit, a constant pressure booster pump $B^0$, a rapid traverse pump RT and a variable escapement metering pump Z. The gear 14 is fixed to a shaft $14^x$ which actuates the booster and rapid traverse pumps and is constantly driven from the gear 13 and in turn it constantly drives a gear 15 which operates the variable escapement metering pump. The oil flowing to and from these three pumps passes under the control of certain valves and thereby is caused to shift the table either in one direction or the other and to propel the table at either a feeding or a quick traverse rate; all as will be explained in connection with the controls.

Figure 6:
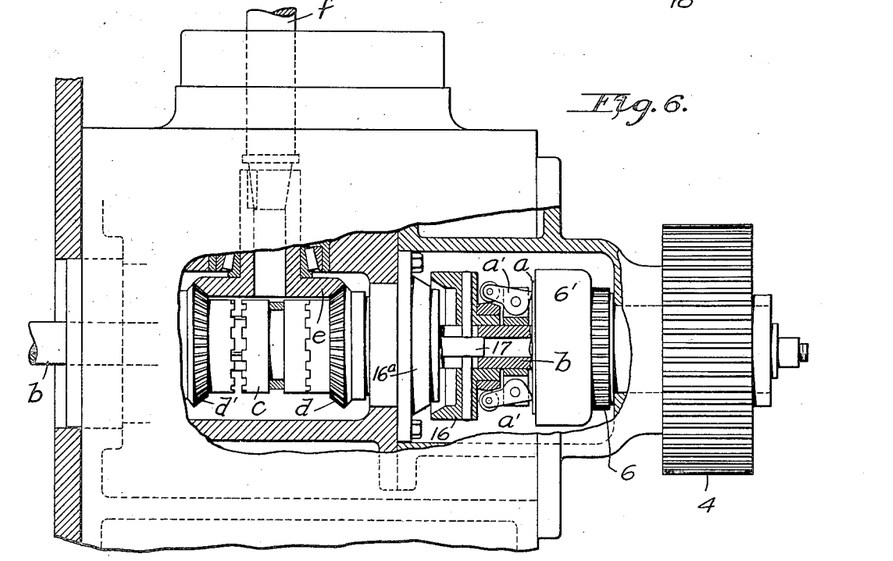
Fig. 6 is a detail of the spindle drive start and stop mechanism.

The cutter is rotated mechanically by a transmission train deriving motion from the clutch 6' previously mentioned. Referring to Fig. 6, a clutch element $a$ is keyed to a hollow shaft $b$ on which is splined a reversing collar $c$ which, when shifted to the one side or the other, will clutch the shaft $b$ either to the bevel gear $d$ or $d'$ and thereby drive the bevel gear $e$ either to the right or to the left. A vertical shaft $f$ is keyed to and leads upwardly from the bevel gear $e$ to enter the casing which carries the spindle and is vertically shiftable on the ways of the column. Splined to the upper end of shaft $f$ is a bevel $g$ which, being journaled in said casing, is enabled to be raised and lowered with said casing by virtue of its spline on the shaft $f$. This bevel gear drives a bevel $h$ on the shaft $h'$ to which is keyed a pinion $i$ driving a pinion $j$ on a shaft $k$ having a pinion $l$ in mesh with a gear $m$ which in turn drives the spindle S'.

When the friction disks between the clutch members 6' and $a$ are compressed, the spindle is being driven: the compression being accomplished by levers $a'$ actuated by a member 16 which is shifted by a telescoped rod 17. Shifting of the rod 17 in the opposite direction brings the member 16 into contact with the brake surface $16^a$ to stop the spindle.

The hand-lever D, at the right side or end of the machine, starts the spindle S' when swung clock-wise, and it applies the brake to stop it quickly when swung counter-clockwise by the user. The mechanical train is as follows: Near the front wall of the base, where the tubular shaft $b$ is journaled, that shaft is slotted to permit the enclosed rod 17 to be connected to a spool 18 slidably carried by the shaft $b$. A short lever 19 pivoted at 20 has its lower end in engagement with said spool and is able to shift it forwardly to stop the spindle or rearwardly to start it. This lever 19 has its upper end notched to receive the lower end of a lever 21 keyed to the left end of a shaft 22 which extends longitudinally of the machine and projects beyond the right hand end of the machine where it carries the lever D. Thus, the user, by manually swinging the lever D is enabled to start and stop the spindle manually.

Figure 3:
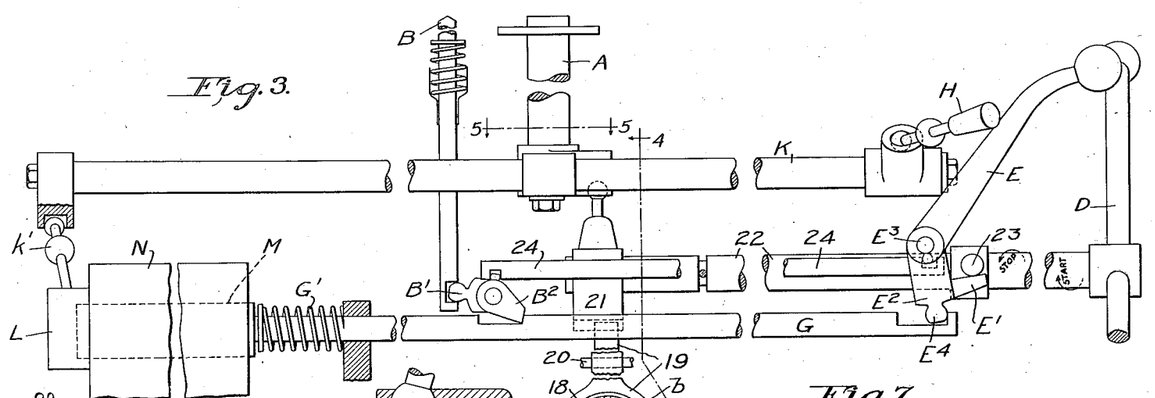
Fig. 3 is an elevation of the trips and manual controls for the main and auxiliary valves and showing details of the interlock between the table reciprocating means and the cutter rotating means.
Figure 4:
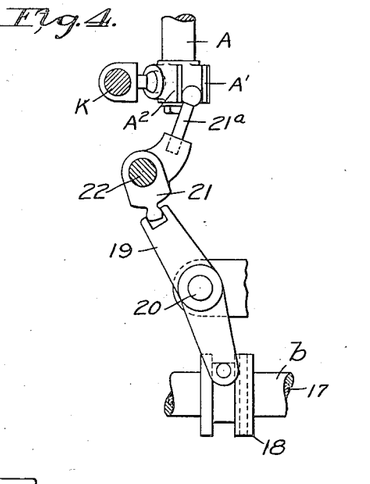
Fig. 4 is a detail section through line 4—4 of Fig. 3.
Figure 5:
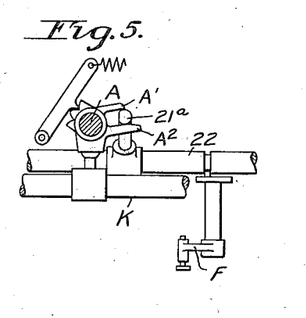
Fig. 5 is a detail section through line 5—5 of Fig. 3.

The cutter should not be stationary when the table is feeding because otherwise the work might be jammed against the cutter and cause damage. Therefore an interlock is so arranged that when the lever D is swung counter-clockwise to arrest the rotation of the spindle, a valve M (to be subsequently described) is operated to prevent the hydraulic unit from causing the table to feed. This is accomplished by means of a pin 23 affixed to a shaft 22 near its right hand end; this pin being in the path of a lug E' projecting sidewise from the lower end of another lever $E^2$ keyed to a short shaft $E^3$ which extends through the front wall of the machine base and has pinned to its exposed end an external hand-lever E located near the right end of the front of the machine. This lever is so connected with the hydraulic valve system that when it is swung counter-clockwise through a short arc, the feed may function. But it can only be moved into that position when the lever D has been swung clockwise sufficiently to start the spindle, and has thereby withdrawn the pin 23 sufficiently to permit the lug E' to move counter-clockwise. Any movement of the lever D counter-clockwise (which stops the spindle) will cause the pin 23 to force the lug E' and swing the lever E clockwise with the effect that the feed will stop.

Reference heretofore has been made solely to certain manual controls. These, however, have been so designed that they admit of being automatically operated. Projecting upwardly from the base and located adjacent the front longitudinal edge of the shiftable table is a mechanical trip A. This may occupy four different positions. It may be axially uplifted or depressed, or it may be partially rotated clockwise or counter-clockwise beyond a neutral position. These four different positions, are, through connections to be described, communicated to a main valve associated with the hydraulic unit. At the lower end of the plunger A is a bifurcation A', one arm ($A^2$) of which is the longer and projects into the path of a finger 21ᵃ extending from the shaft 22. These parts are so proportioned that a partial rotation of the plunger A counter-clockwise will cause the member A² to swing the finger 21ᵃ and turn the shaft 22 clockwise and start the spindle. The reason the fork A' has one tine longer than the other is because it is not always desirable that a rotation of the plunger A clockwise shall automatically arrest the rotation of the spindle. It will do so when the finger 21ᵃ lies between the tines of the fork. But the shaft 22 may be set manually (by swinging the small finger lever F) through 180° and this will shift the finger 21ᵃ to the right sufficiently so that it is within the path of the tine A² only. With this setting, the plunger A may obviously be partially rotated clockwise without imparting motion to the shaft 22 and without stopping the spindle.

An automatic trip for stopping the feed is indicated by B. This is a plunger rod normally held uplifted by a spring and located at the front edge of the table near the aforesaid plunger A. When a dog adjustably mounted on the table approaches the plunger rod B either from the left or from the right, as may be, it depresses that rod causing it to swing counter-clockwise a short lever B' having a pawl B². normally holding a stop rod G in its inoperative position. A depression of the plunger rod B will free the pawl B² from the stop rod G; permitting the spring G' to shift it to the left to its stopped position if its movement is not otherwise obstructed by the projection E⁴ associated with the lever E. However, a rod 24 has a close notched fit with a short lever B' and a sufficiently loose fit with the arm E² associated with the lever E to permit the pawl B² to be readily disengaged from its notch. The spring G' then pushes the stop rod G and the valve M attached thereto to the left and swings the hand lever E clockwise. The user can subsequently grasp this hand lever to swing it counter-clockwise to restore the parts to their previous condition. Conversely, by manually swinging the lever E clockwise, the connecting rod 24 is shifted to the left and the pawl B² is raised clear of its notch so that the spring G' may shift the stop rod G to the left as fast as the finger E⁴ is moved to the left by the manual operation of the lever D. Thus the feed will be stopped under each of the following conditions: (1) When a dog moving to the left depresses the plunger rod B; (2) when a dog moving to the right depresses the plunger rod B; (3) if the operator turns the lever E clockwise; (4) if the operator turns the lever D counter-clockwise and (5) if the plunger A is turned clockwise when the finger lever F has been set to its left side but not when it has been set to its right side.

The effect on the valve system of shifting the plunger A into either one of its four different positions may now be investigated. These four positions are attainable automatically by appropriate dogs adjustably arranged on the front edge of the table or by the universally mounted hand lever H, which is arranged at the front wall of the machine near its right hand end.

The plunger A and the hand lever H are each connected by a ball and socket joint with a long rod K which extends from one end of the machine to the other; being in turn connected at its left end through a ball and socket link k' with a main control valve L. This, accordingly, may be set into either one of four different positions depending upon the shift given to the pilot A or the handle H as the case may be. The valve L may thus be set to the left or to the right or swung clockwise or counter-clockwise. These four positions yield all the combinations of rates and directions of movement required for such cycles as are required in various milling operations; an auxiliary supplemental valve M (operated by the stop rod G previously described) being in certain cases required i. e. for a so-called "reciprocating feed" cycle.

Before detailing the manner in which the main valve diverts the flow of the fluid, it should be noted that, wholly unlike conventional systems, the advance of the piston that propels the table is governed by the rate of escapement rather than by the rate of admission of the oil. There are two sources of oil; the large capacity low pressure source for economically effecting rapid traverse movements where no resistance is offered by the tool, and a low capacity high pressure source for effecting a movement at a feeding rate against great opposition. This opposition is a result of a heavy back pressure where the oil is retained by a metering device in advance of the piston plus or minus a force exerted by the cutter depending upon whether it is rotating with or against the direction of the travel, as the case may be. The direction of the cutter is determined by the setting of the reversing clutch previously described so that it may be run in the usual and customary manner opposite to the direction of the feed, or with the feed. The peculiar character of this proposed hydraulic system enables the cutter to be run with the feed with entire success, it being impossible, by reason of the heavy opposed hydraulic pressures for the cutter to cause an over-running of the table. The table is held vise-like under the differential control of the high pressure source and the metering escapement. The pressures are high and by this is meant a magnitude comparable with the maximum cutting force of a high duty cutter. In the case of a present day milling cutter in a 15 H. P. machine, this may be exemplified as attaining in the neighborhood of five tons and if the cutter be rotated against the feed, the constant urge will be of a sufficiently greater magnitude to result in a feeding of the table at the positively uniform rate insured by the conversely acting hydraulic effort. This opposed system puts into unique effect a latent characteristic of the oil; to wit, a very slight yet perceptive resiliency which, under what may be termed opposite compression, affords a dampened yield and retarded recovery which is ideally compatible with refined tooling requirements. Consequently, the pronounced chatter caused by the inevitable back-lash in purely mechanical feeds, as well as the hammer-like vibrations attributable to the torsional resiliency of a long screw or shaft, are not exhibited in this hydraulic opposed system.

Figures 7, 8:
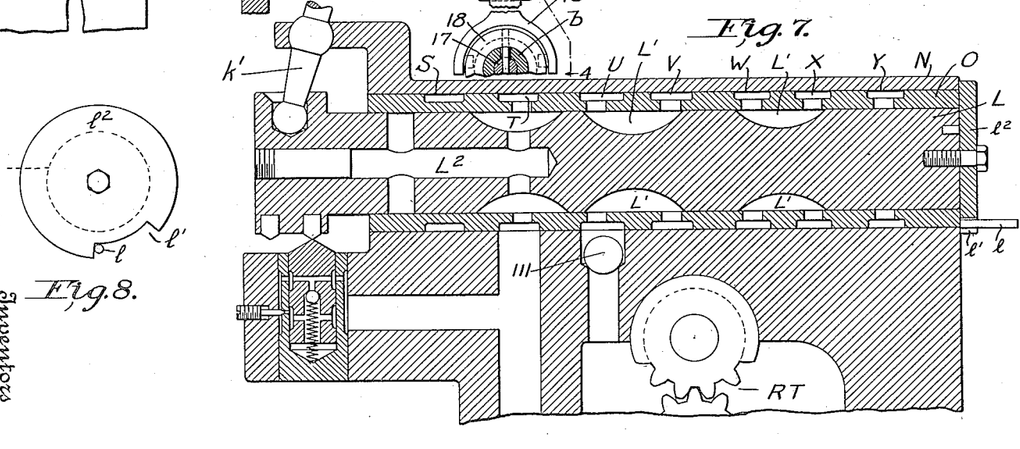
Fig. 7 is a longitudinal section through the main control valve.
Fig. 8 shows an end of the valve with its stop-pin for limiting its extent of rotation clockwise and counter-clockwise.

Deferring the explanation of the details of the three pumps and, for the present, considering the main valve it is in the general form of a cylinder having its periphery provided with a diversity of longitudinal extending slots. The number, relationship, and proportions of these slots will be arranged compatibly with the cycle or cycles desired by the user of the machine. This valve element admits of being very easily removed and replaced by another suitably configurated. The casing or housing for this valve element is so designed that it need not be interchanged when a modified valve element is substituted. For example, the casting N is bored to receive a bushing O diversely perforated and channeled to provide a diversity of ports. Thus, it has given peripheral grooves S, T, U, V, W, X and Y. The channels S and Y each communicate through appropriate conduits with the left end of the cylinder $T^{30}$, and the channel V with the right end of the cylinder. The channel U receives and is always filled by a copious flow from the rapid traverse pump. When this flow is not being used to actuate the piston $T^{20}$ and the table propelled thereby, it is, through the agency of the valve element L, freely in communication with channel T which again through a suitable conduit leads to the reservoir. If the table is to be traversed rapidly to the right, the channel U is put into communication with the channel S leading to the left end of the cylinder, and if the table is to be traversed rapidly to the left the channel U is put into communication with the channel V which is conduited to the right end of the cylinder. The channel W is always in communication with and receives a relatively low flow of oil under high pressure from a variable escapement pump Z supplemented by a booster pump $B^0$. Channel X is conduited to the inlet end of the variable escapement pump and when a rapid traverse is being effected the valve element connects channels W and X to permit the idling of the high pressure oil. When the feed takes place, however, channel W is connected either with channel V or with channel Y depending upon whether the take is to be fed to the left or fed to the right.

To accomplish these communications the channels are provided with an arrangement of ports. These are clearly shown in the diagrammatic view Fig. 9 and occupies positions defined by longitudinal and polar coordinates. The channel S has ports designated $S^2$, $S^3$, $S^6$ and $S^7$. The channel T has ports designated $T^0$, $T^2$, $T^4$ and $T^6$. The channel U has ports designated $U^0$, $U^3$, $U^4$, and $U^7$. The channel V has ports designated $V^0$, $V^2$, $V^4$ and $V^6$. The channel W has ports designated $W^0$, $W^3$, $W^4$ and $W^7$. The channel X has ports designated $X^0$, $X^2$, $X^4$ and $X^6$. The channel Y has ports designated $Y^0$, $Y^3$, $Y^4$ and $Y^7$. The ports above referred to are arranged in diametrically opposite pairs, as follows:— $S^2$—$S^6$: $S^3$—$S^7$: $T^0$—$T^4$: $T^2$—$T^6$: $U^0$—$U^4$: $U^3$—$U^7$: $V^0$—$V^4$: $V^2$—$V^6$: $W^0$—$W^4$: $W^3$—$W^7$: $X^0$—$X^4$: $X^2$—$X^6$: $Y^0$—$Y^4$: $Y^3$—$Y^7$, the purpose of this being to double the effective areas and render the arrangement of conduits more convenient, and to provide a balance of pressure upon the valve element L.

It will be seen that the function of the valve element L is to appropriately bridge these ports so as to direct the flow according to the needs. This valve element L accordingly has a series of bridging slots, referred to generally as $L'$, supplemented by bores $L^2$. The geometrical relationship of these bridging slots can best be grasped by referring to Fig. 9 of the drawings which shows the development of the periphery of the particular valve element L compatible with a reciprocating feed cycle in which there occurs a rapid traverse to the left followed by a feed to the left and then a rapid traverse to the right followed by a feed to the right; all in repeating cycles. In this case the auxiliary valve M is employed for the purpose of effecting a stoppage of the movement.

It may here be noted that the novel valve constructions disclosed herein is compatible either with a conventional hydraulic system (where the feed is not governed by an escapement control but by the rate of admission) or with the unique system herein revealed wherein they are, during the feed, opposed pressures and the rate of feed is governed solely by a volumetrically constant escapement. Since the valves have been shown in combination with the new system, it will be well, therefore, to consider the relations of the return ports.

When any return port (series T) is connected to the left end of the cylinder through a port of series S, there will be no opposition to the movement of the piston to the left and the table will travel rapidly to the left. If connected to the right end of the cylinder (through series V) the table will traverse rapidly to the right.

When any return port (series X) is connected to the left end of the cylinder through a port of series Y, oil will at a volumetrically constant rate be metered out and the piston and table will feed to the left; its rate of feed being determined by the adjustment of the meter Z. If connected to the right end of the cylinder (through any port of series V), the table will feed to the right.

Figure 9:
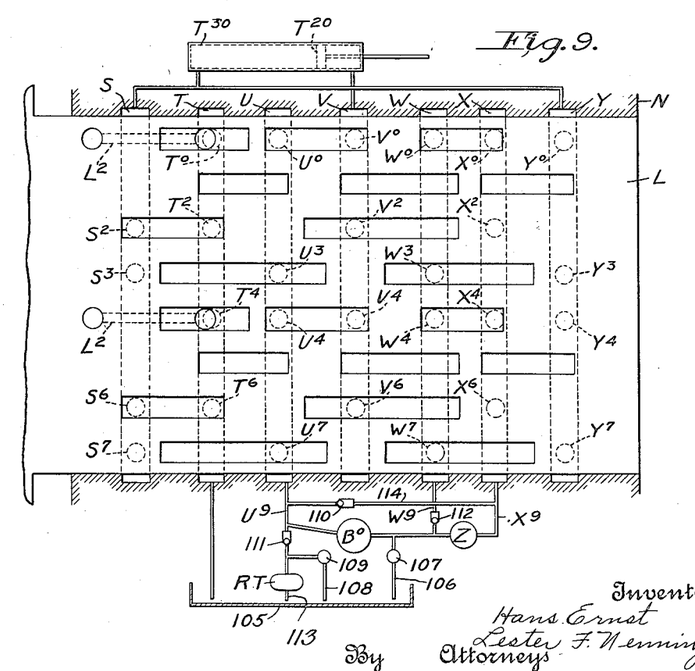
Fig. 9 is a development of the main valve and its cooperating bushing illustrated in Fig. 7 showing them connected diagrammatically with the improved hydraulic system.
Figure 10:
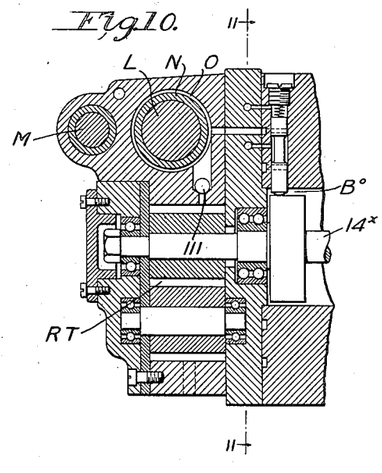
Fig. 10 is a vertical section showing details of the low pressure high capacity pump and of the booster pump.
Figure 11:
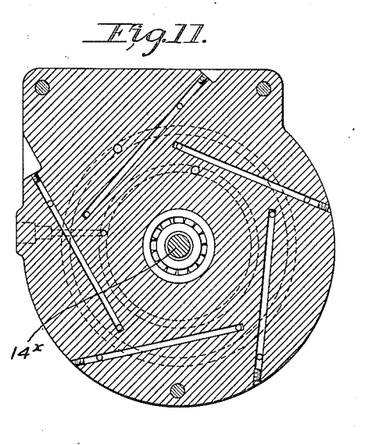
Fig. 11 is a section through line 11 of Fig. 10 showing the channeling of the casing for the booster pump.

In the position shown in Figs. 7 and 9, the valve is set to effect movement of the table to the left at a rapid traverse speed. If now it be turned clockwise 45° without shifting it axially, a feed to the left will result, and then if it be shifted to the right without any turning a rapid traverse to the right will result. A counter-clockwise rotation of the valve will then reduce the rate of travel of the table and effect a feeding movement thereof to the right. From this position the valve may again be shifted to the left to the position shown in Figs. 7 and 9 to initiate a new cycle. The extent of oscillation of the valve L is limited by means of a pin $l$ fixed in the sleeve N and engaging the end walls of a segmental notch $l'$ formed in a plate $l^2$ secured to the valve.

The diagram (Fig. 2) showing the source of the oil and the principles of the hydraulic system may now be understood. Oil is delivered by the hydraulic system to the main valve L copiously and under low pressure through conduit $U^9$, and at a low capacity high constant pressure through conduit $W^9$. The escapement at a volumetrically uniform rate occurs through the pipe $X^9$; these two last mentioned pipes leading respectively to the outlet and intake of the variable metering escapement pump Z. This might well discharge directly into the reservoir 105 because it is not primarily intended to maintain the high constant pressure in line $W^9$, but it is of advantage so to do. The oil so delivered into the conduit $W^9$ is supplemented by a small quantity under a high pressure booster pump $B^0$, which draws its supply from the line $U^9$ which receives a copious flow under low pressure from the rapid traverse pump RT; the latter getting its supply through the pipe 113 leading from the reservoir 105. It may happen, at times, that the feed of the table is arrested, either by a fixed stop or by the excess resistance of the cutter and to provide an outlet in such circumstances for the surplus oil being fed into the line $W^9$, a high pressure relief valve 107 is arranged in a return branch line 106.

Figure 1:
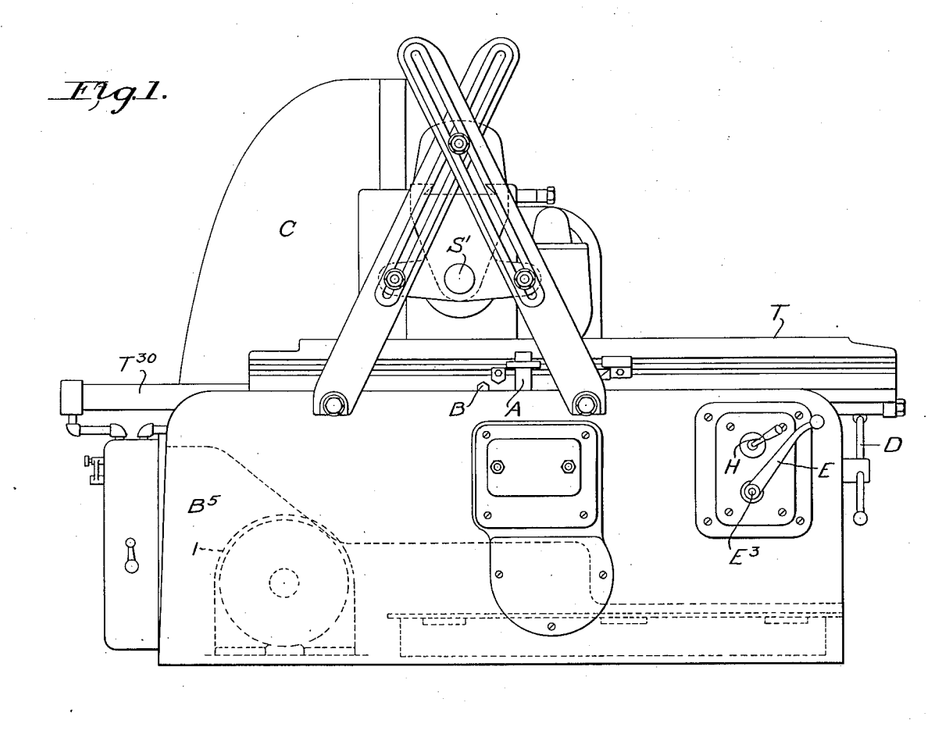
Figure 1 is a side elevation of a milling machine embodying the present invention.
Figure 2:
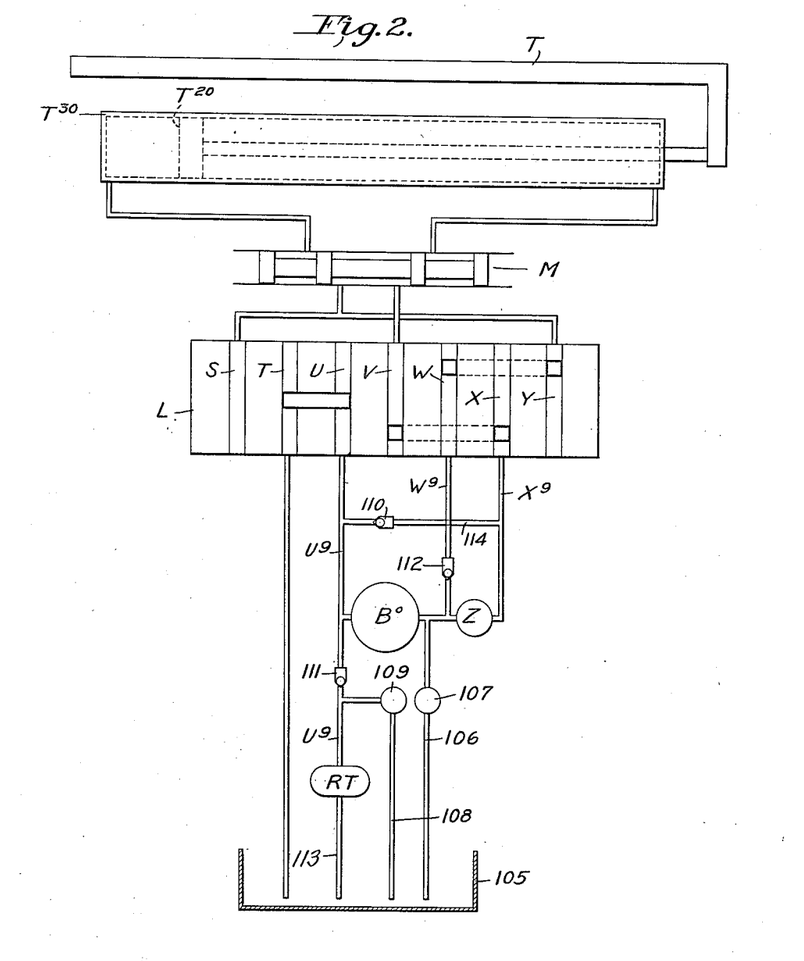
Fig. 2 is a diagrammatic representation of the improved hydraulic system embodied in the machine illustrated in Fig. 1.

There are occasions when the feeding of the table is resisted and the back pressure in the return line $X^9$ may thereby fall to a low value and the metering pump Z would not be properly fed with oil. To prevent that circumstance, a shunt line 114 extends from the outlet side of the rapid traverse pump line and leads to the return line $X^9$, and in this shunt line is a check valve 110; this valve permitting no flow from the feed line to the rapid traverse line but permitting a flow in the contrary direction when the pressure in the feed line unduly diminishes. As shown by Fig. 2, it is desirable also to have a check valve 112 in the discharge line from the variable displacement pump; especially when the discharge from that pump is used to supplement the feeding pressure from the booster pump instead of discharging immediately to the reservoir.

Inasmuch as the rapid traverse pump may, at times, deliver a more copious quantity of oil than will be taken by the system, a low pressure relief valve 109 in the nature of an emergency relief is provided in a branch circuit 108 extending to the reservoir from the outlet conduit from the rapid traverse pump and to prevent any reversal in flow when a cutter causes a pressure in excess of the supply pressure, a check valve 111 is located as shown by the diagram.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States.

1. A machine tool combining work and cutter supports; a hydraulic actuator for one of said supports; a source of high constant pressure oil; a copious source of low pressure oil; a continuously running escapement device for passing oil at selective volumetrically uniform rates; a main valve; means automatically operated by the propelled support for cyclicly shifting said main valve to cause said hydraulic actuator to propel its carrier at rapid traverse and feeding rates and to reverse the direction of propulsion; and an auxiliary valve for arresting all flow to or from said hydraulic actuator.

2. A machine tool combining a cutter spindle; a table; a mechanical rotator for said spindle; a hydraulic reciprocator for said table; a source of fluid under pressure; a main valve intervening between said source and said reciprocator for determining the direction and rate of action of said reciprocator; an auxiliary valve for stopping all flow to or from said actuator; and means adapted to be operated in connection with said auxiliary valve for enabling it to be opened only when said spindle is rotated.

3. A machine tool combining a rotary cutter spindle; a support for said spindle and a support for work; a hydraulic motor for propelling one of said supports; a source of fluid pressure connected by conduits with said hydraulic motor; a valve controlling the rate and direction of flow of fluid to said motor; an auxiliary valve embodied in said conduits for disconnecting said source of fluid pressure from said hydraulic motor and for locking the fluid in the motor against escape therefrom; means to actuate said auxiliary valve; mechanical means for rotating said spindle; a clutch for starting and stopping said spindle; clutch actuating means; and an interlock between the auxiliary valve actuating means and the clutch actuating means to insure rotation of the spindle when the hydraulic system is effective to propel one of said supports.

4. A machine tool combining work and cutter supports; a hydraulic actuator for one of said supports; a source of high constant pressure oil; a copious source of low pressure oil; a continuously running escapement device for passing oil at selective volumetrically uniform rates; a main valve; means automatically operated by the propelled support for cyclicly shifting said main valve to cause said hydraulic actuator to propel its carrier at rapid traverse and feeding rates and to reverse the direction of propulsion; an auxiliary valve for arresting all flow to or from said hydraulic actuator; manual means for shifting said auxiliary valve to one position to arrest the flow from said actuator and aumomatic means to shift it to another position to permit flow from said actuator.

5. A machine tool combining work and cutter supports; a hydraulic actuator for one of said supports; a source of high constant pressure oil; a copious source of low pressure oil; a continuously running escapement device for passing oil at selective volumetrically uniform rates; a main valve; means automatically operated by the propelled support for cyclicly shifting said main valve to cause said hydraulic actuator to propel its carrier at rapid traverse and feeding rates and to reverse the direction of propulsion; an auxiliary valve for arresting all flow to or from said hydraulic actuator; manual means for shifting said auxiliary valve to one position to arrest the flow from said actuator and automatic means, actuated by the movement of the translated support, to shift it to another position to permit flow from said actuator.

6. A machine tool combining a hydraulic motor including a cylinder and a piston therein; a carrier propelled by said motor; means including a pump and conduits for building up fluid pressure in one end of said motor; a metering escapement pump connected by a conduit to the other end of said motor to regulate volumetrically the rate at which fluid is exhausted from the exhaust end of said motor; and a valve connected with both the intake and exhaust conduits and adapted by adjustment to prevent fluid both from entering and leaving said motor positively to lock said motor and carrier against movement in either direction.

7. A machine tool combining a rotatable cutter spindle; translatable work-table; mechanical means for rotating the spindle; a clutch controlling said spindle rotating means, hydraulic means for translating the table including a hydraulic motor and a fluid pressure system connected with said motor; a stop valve embodied in said hydraulic system and adapted in one position to permit fluid to flow to and from said motor and in another position to inhibit such flows thereby to lock the table against movement in either direction; manual means to actuate said clutch to start rotation of said spindle; and means controlled by said clutch-shifting mechanism to shift said stop valve to its flow-permitting position.

8. A machine tool combining a translatable member; a hydraulic motor to translate said member, a hydraulic system connected with said motor and adapted to admit fluid under pressure into one end thereof, said system including a pump adapted to permit escape of fluid only at a volumetrically uniform rate from the exhaust end thereof; a stop valve embodied in said hydraulic system and having portions adapted in one position to permit flow of fluid therethrough and in another position to inhibit such flow thereby to lock the translated member against movement and effect free circulation of the pressure fluid; and means actuated by the movement of said translatable member to shift said valve into flow-inhibiting position.

9. A machine tool combining a translatable member; a hydraulic motor to translate said member; a hydraulic system connected with said motor and adapted to admit fluid under pressure into one end of said motor and to permit escape of fluid, at volumetrically uniform rates from the other end thereof; a stop valve embodied in said hydraulic system and adapted in one position to permit flow of fluid therethrough and in another position to inhibit such flow thereby to lock the translated member against movement; means normally urging said valve toward its flow-inhibiting position; latch mechanism acting in opposition to the last named means to hold the valve in flow-permitting position; and means actuated by the movement of said member to render said latch mechanism ineffective, thereby to permit said valve to move under the influence of its urging means, to flow-inhibiting position.

In witness whereof, we have hereunto subscribed our names.

HANS ERNST.
LESTER F. NENNINGER.